United States Patent
Jo et al.

(10) Patent No.: US 11,630,350 B2
(45) Date of Patent: Apr. 18, 2023

(54) LIQUID CRYSTAL ALIGNMENT COMPOSITION, METHOD FOR PREPARING LIQUID CRYSTAL ALIGNMENT FILM, AND LIQUID CRYSTAL ALIGNMENT FILM USING THE SAME

(71) Applicant: LG CHEM, LTD., Seoul (KR)

(72) Inventors: Jung Ho Jo, Daejeon (KR); Hee Han, Daejeon (KR); Hang Ah Park, Daejeon (KR); Soon Ho Kwon, Daejeon (KR); Jun Young Yoon, Daejeon (KR); Hyeong Seuk Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 207 days.

(21) Appl. No.: 15/777,846

(22) PCT Filed: Jun. 20, 2017

(86) PCT No.: PCT/KR2017/006476
§ 371 (c)(1),
(2) Date: May 21, 2018

(87) PCT Pub. No.: WO2017/222281
PCT Pub. Date: Dec. 28, 2017

(65) Prior Publication Data
US 2018/0348578 A1    Dec. 6, 2018

(30) Foreign Application Priority Data
Jun. 21, 2016   (KR) .......................... 10-2016-0077525

(51) Int. Cl.
*G02F 1/1337*   (2006.01)
*C08G 73/10*    (2006.01)
*C09K 19/56*    (2006.01)
*C09D 179/08*   (2006.01)

(52) U.S. Cl.
CPC .............. *G02F 1/133723* (2013.01); *C08G 73/1046* (2013.01); *G02F 1/133711* (2013.01); *G02F 1/133788* (2013.01); *C08G 73/1078* (2013.01); *C09D 179/08* (2013.01); *C09K 19/56* (2013.01); *C09K 2323/025* (2020.08); *C09K 2323/027* (2020.08)

(58) Field of Classification Search
CPC ............ C08G 73/1046; C08G 73/1078; C09D 179/08; C09K 19/56; C09K 2323/025; C09K 2323/027; G02F 1/133711; G02F 1/133723; G02F 1/133788; Y10T 428/1023
See application file for complete search history.

(56) References Cited

U.S. PATENT DOCUMENTS

| | | | |
|---|---|---|---|
| 5,571,579 A | 11/1996 | Kato et al. | |
| 6,294,639 B1 | 9/2001 | Sawahata et al. | |
| 8,057,700 B2 | 11/2011 | Oh et al. | |
| 9,766,501 B2 | 9/2017 | Park et al. | |
| 9,846,332 B2 | 12/2017 | Park et al. | |
| 2003/0087045 A1* | 5/2003 | Nakata | G02F 1/133711 428/1.27 |
| 2005/0179006 A1 | 8/2005 | Imamura et al. | |
| 2007/0071913 A1* | 3/2007 | Fujii | G02F 1/133711 428/1.2 |
| 2009/0053430 A1* | 2/2009 | Matsumori | G02F 1/137 428/1.25 |
| 2009/0194737 A1* | 8/2009 | Lai | C08G 73/1042 252/299.4 |
| 2010/0155661 A1 | 6/2010 | Yang et al. | |
| 2012/0229744 A1* | 9/2012 | Hattori | C08F 2/50 349/124 |
| 2013/0165598 A1 | 6/2013 | Yoo et al. | |
| 2015/0105503 A1* | 4/2015 | Ooki | C08G 73/10 524/95 |
| 2016/0244673 A1* | 8/2016 | Kunimi | C08G 73/1078 |
| 2017/0184923 A1* | 6/2017 | Omura | C08L 79/08 |
| 2017/0343864 A1 | 11/2017 | Park et al. | |
| 2018/0067365 A1 | 3/2018 | Park et al. | |

FOREIGN PATENT DOCUMENTS

| | | | | |
|---|---|---|---|---|
| CN | 1656413 A | 8/2005 | | |
| CN | 101373296 A | 2/2009 | | |
| CN | 100569907 C | 12/2009 | | |
| CN | 101759669 A | 6/2010 | | |
| CN | 102061180 A | 5/2011 | | |
| CN | 103173228 A | 6/2013 | | |
| CN | 103387833 A | 11/2013 | | |
| CN | 104059675 A | 9/2014 | | |
| CN | 104884533 A | 9/2015 | | |
| CN | 108291149 B | * 12/2021 | ......... | C08G 73/1046 |
| JP | H07-234410 A | 9/1995 | | |
| JP | H09-185064 A | 7/1997 | | |
| JP | 2000-144136 A | 5/2000 | | |
| JP | 3612832 B2 | 1/2005 | | |
| JP | 2007-034284 A | 2/2007 | | |
| JP | 2013-235130 A | 11/2013 | | |
| JP | 5513446 B2 | 6/2014 | | |
| JP | 2015-108092 A | 6/2015 | | |
| JP | 2015-222387 A | 12/2015 | | |
| JP | 6805452 B2 | * 12/2020 | ......... | C08G 73/1046 |
| KR | 10-2004-0046229 A | 6/2004 | | |

(Continued)

OTHER PUBLICATIONS

Search Report and Written Opinion issued for International Application No. PCT/KR2017/006476 dated Dec. 7, 2017, 13 pages.

*Primary Examiner* — Sophie Hon
(74) *Attorney, Agent, or Firm* — Rothwell, Figg, Ernst & Manbeck, P.C.

(57) ABSTRACT

The present invention relates to a liquid crystal alignment composition for the preparation of a liquid crystal alignment film having enhanced alignment property and stability and exhibiting a high voltage holding ratio, a method for preparing a liquid crystal alignment film using the same, and a liquid crystal alignment film and a liquid crystal display device using the same.

9 Claims, No Drawings

(56) References Cited

FOREIGN PATENT DOCUMENTS

| | | | |
|---|---|---|---|
| KR | 10-2006-0043138 A | 5/2006 | |
| KR | 10-2006-0048216 A | 5/2006 | |
| KR | 10-0601067 B1 | 7/2006 | |
| KR | 10-2007-0115780 A | 12/2007 | |
| KR | 10-0841868 B1 | 6/2008 | |
| KR | 10-0842156 B1 | 6/2008 | |
| KR | 10-2008-0063148 A | 7/2008 | |
| KR | 10-0849812 B1 | 7/2008 | |
| KR | 10-2009-0024080 A | 3/2009 | |
| KR | 10-2009-0060000 A | 6/2009 | |
| KR | 10-2009-0068098 A | 6/2009 | |
| KR | 10-2011-0055384 A | 5/2011 | |
| KR | 10-2011-0064102 A | 6/2011 | |
| KR | 10-2012-0098421 A | 9/2012 | |
| KR | 10-2013-0038243 A | 4/2013 | |
| KR | 10-1286432 B1 | 7/2013 | |
| KR | 10-2014-0004189 A | 1/2014 | |
| KR | 10-1387735 B1 | 4/2014 | |
| KR | 10-2014-0146523 A | 12/2014 | |
| KR | 10-2015-0001826 A | 1/2015 | |
| KR | 10-2015-0037575 A | 4/2015 | |
| KR | 10-2015-0037576 A | 4/2015 | |
| KR | 10-1536028 B1 | 7/2015 | |
| KR | 10-2016-0123172 A | 10/2016 | |
| KR | 10-2017-0055418 A | 5/2017 | |
| KR | 101856727 B1 * | 5/2018 | ......... C08G 73/1046 |
| TW | 200634378 A | 10/2006 | |
| TW | 200934825 A | 8/2009 | |
| TW | 201124512 A | 7/2011 | |
| TW | 201604237 A | 2/2016 | |
| TW | I670294 B * | 9/2019 | ......... C08G 73/1046 |
| WO | 2015-152174 A1 | 10/2015 | |

\* cited by examiner

LIQUID CRYSTAL ALIGNMENT COMPOSITION, METHOD FOR PREPARING LIQUID CRYSTAL ALIGNMENT FILM, AND LIQUID CRYSTAL ALIGNMENT FILM USING THE SAME

CROSS-REFERENCE TO RELATED APPLICATION

This application is a 35 U.S.C. 371 National Phase Entry Application from PCT/KR2017/006476, filed Jun. 20, 2017, which claims the benefit of priority from Korean Patent Application No. 10-2016-0077525 filed on Jun. 21, 2016 with the Korean Intellectual Property Office, the disclosures of which are incorporated herein by reference in their entirety.

TECHNICAL FIELD

The present invention relates to a liquid crystal alignment composition having enhanced alignment property and stability and exhibiting a high voltage holding ratio, a method for preparing a liquid crystal alignment film using the same, and a liquid crystal alignment film and a liquid crystal display device using the same.

BACKGROUND ART

In a liquid crystal display device, a liquid crystal alignment film plays a role of aligning liquid crystals in a certain direction. Specifically, a liquid crystal alignment film serves as a director in the arrangement of liquid crystal molecules, and thus, when the liquid crystals move by the electric field to form an image, it helps to take an appropriate direction. In order to obtain uniform brightness and a high contrast ratio in a liquid crystal display device, it is essential that the liquid crystals are uniformly aligned.

As one of the conventional methods for aligning a liquid crystal, a rubbing method of coating a polymer film such as polyimide onto a substrate such as glass and rubbing the surface thereof in a predetermined direction using fibers such as nylon or polyester has been used. However, the rubbing method may cause serious problems during manufacturing a liquid crystal panel because fine dust or electrostatic discharge (ESD) occurs when the fiber and polymer film are rubbed.

In order to solve the problems of the rubbing method, a photo-alignment method of inducing anisotropy in a polymer film by light irradiation rather than the rubbing, and aligning liquid crystals using the anisotropy has been studied recently.

As materials that can be used for the photo-alignment method, various materials have been introduced, among which polyimide is mainly used for various superior performance of a liquid crystal alignment film. However, polyimde is usually poor in solubility in a solvent, and so it is difficult to apply it directly to a manufacturing process for forming an alignment film by coating in a solution state. Accordingly, after coating in the form of a precursor such as a polyamic acid or a polyamic acid ester having excellent solubility, a high-temperature heat treatment process is performed to form polyimide, which is then subjected to light irradiation to align liquid crystals. However, as a large amount of energy is required for obtaining sufficient liquid crystal alignment properties by subjecting the films of polyimide to light irradiation, it is difficult to secure substantial productivity, and additionally, there is a limitation that an additional heat treatment process is required for securing alignment stability after the light irradiation.

In addition, a high voltage holding ratio (VHR) should be exhibited for high-quality driving of the liquid crystal display device, but it is difficult to exhibit the same by using only polyimide.

DETAILED DESCRIPTION OF THE INVENTION

Technical Problem

It is one object of the present invention to provide a liquid crystal alignment composition for the preparation of a liquid crystal alignment film having enhanced alignment property and stability and exhibiting a high voltage holding ratio.

It is another object of the present invention to provide a method for preparing a liquid crystal alignment film using the above-described liquid crystal alignment composition.

It is a further object of the present invention to provide a liquid crystal alignment film prepared by the above preparation method and a liquid crystal display device including the same.

Technical Solution

In order to overcome the objects above, the present invention provides a liquid crystal alignment composition comprising: (i) a polymer for liquid crystal alignment agent including two or more repeating units selected from the group consisting of a repeating unit represented by Chemical Formula 1 below, a repeating unit represented by Chemical Formula 2 below and a repeating unit represented by Chemical Formula 3 below, wherein the repeating unit represented by Chemical Formula 1 below is contained in an amount of 5 to 74 mol % relative to the total repeating units represented by Chemical Formulae 1 to 3 below, and (ii) a compound having two or more epoxy groups in a molecule.

[Chemical Formula 1]

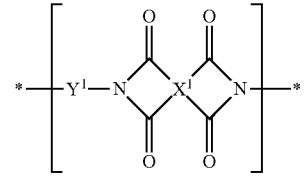

[Chemical Formula 2]

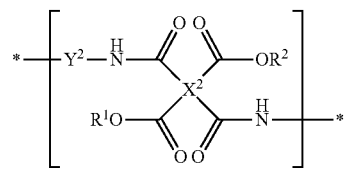

[Chemical Formula 3]

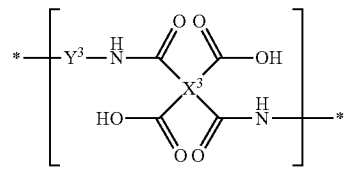

in Chemical Formulae 1 to 3, $R^1$ and $R^2$ are each independently hydrogen, or $C_{1-10}$ alkyl, with the proviso that both $R^1$ and $R^2$ are not hydrogen, $X^1$ is a tetravalent organic group represented by Chemical Formula 4 below,

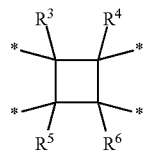

[Chemical Formula 4]

in Chemical Formula 4, $R^3$ to $R^6$ are each independently hydrogen, or $C_{1-6}$ alkyl, $X^2$ and $X^3$ are each independently a tetravalent organic group derived from a hydrocarbon having 4 to 20 carbon atoms, a tetravalent organic group in which at least one hydrogen in the tetravalent organic group is substituted with a halogen, or a tetravalent organic group in which at least one —$CH_2$— is replaced by —O—, —CO—, —S—, —SO—, —$SO_2$— or —CONH— such that oxygen or sulfur atoms are not directly linked, and $Y^1$, $Y^2$ and $Y^3$ are each independently a divalent organic group represented by Chemical Formula 5 below,

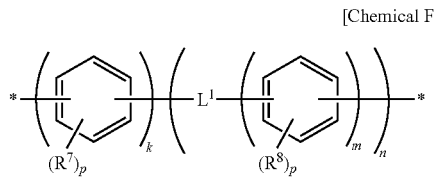

[Chemical Formula 5]

in Chemical Formula 5, $R^7$ and $R^8$ are each independently halogen, cyano, $C_{1-10}$ alkyl, $C_{2-10}$ alkenyl, $C_{1-10}$ alkoxy, $C_{1-10}$ fluoroalkyl, or $C_{1-10}$ fluoroalkoxy, p and q are each independently an integer of 0 to 4, $L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —NH—, —$NH(CH_2)_z$—NH—, —$NH(CH_2)_z$—, —$OCH_2$—C$(CH_3)_2$—$CH_2O$—, —COO—$(CH_2)_z$—OCO—, or —OCO—$(CH_2)_z$—COO—, z is an integer of 1 to 10, k and m are each independently an integer of 1 to 3, and n is an integer of 0 to 3.

When a conventional polyimide is used as a liquid crystal alignment film, a polyimide precursor, a polyamic acid or a polyamic acid ester having excellent solubility is coated and dried to form a coating film, which is then converted to a polyimide through a heat treatment process at a high temperature, followed by light irradiation to perform alignment treatment. However, a large amount of energy is required for obtaining sufficient liquid crystal alignment properties by subjecting the films of polyimide to light irradiation, and also an additional heat treatment process is undergone for securing alignment stability after the light irradiation. Since the large amount of light irradiation energy and the additional high-temperature heat treatment process are very disadvantageous in view of the cost of the process and process time, there existed a limitation in the application to a practical mass production process.

In view of the above, the present inventors have found that, when the above-described polymer for liquid crystal alignment agent is used, the polymer contains a certain amount of already imidized imide repeating units and thus, anisotropy can be produced by directly irradiating the light without a heat treatment process after the formation of a coating film, followed by conducting a heat treatment to complete the alignment film, and thereby, not only the light irradiation energy can be significantly reduced, but also a liquid crystal alignment film having enhanced alignment properties and stability can be prepared even by a simple process including one heat treatment step.

The present inventors has also found that, in addition to the above-described polymer for liquid crystal alignment agent, the liquid crystal alignment composition includes a compound having two or more epoxy groups in a molecule, and thereby a liquid crystal alignment film prepared therefrom not only exhibits a high voltage holding ratio but also improves the alignment stability due to thermal stress and the mechanical strength of the alignment film. Although not being limited theoretically, thermal crosslinking reaction occurs between the compound having an epoxy group and the carboxylic acid group of a polyimide precursor or a partially imidized polymer in a heat treatment process after generation of anisotropy by light irradiation, thereby increasing the voltage holding ratio. In addition, since a compound having two or more epoxy groups in a molecule is used, not only these properties are further improved, but also a crosslinking reaction occurs between the polyimide precursor or partially imidized molecular chains, thereby increasing the alignment stability and the mechanical strength of the alignment film.

Hereinafter, the present invention will be described in more detail.

DEFINITION OF TERMS

Unless specified otherwise herein, the following terms can be defined as follows.

The $C_{4-20}$ hydrocarbon may be $C_{4-20}$ alkane, $C_{4-20}$ alkene, $C_{4-20}$ alkyne, $C_{4-20}$ cycloalkane, $C_{4-20}$ cycloalkene, $C_{6-20}$ arene, or a fused ring in which at least one of the cyclic hydrocarbons shares two or more atoms, or a hydrocarbon to which at least one of the hydrogens is chemically bonded. Specifically, examples of $C_{4-20}$ hydrocarbon may include n-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethylcyclohexene, bicyclohexyl, benzene, biphenyl, diphenylmethane, 2,2-diphenylpropane, 1-ethyl-1,2,3,4-tetrahydronaphthalene or 1,6-diphenylhexane, etc.

The $C_{1-10}$ alkyl group may be a straight-chain, branched-chain or cyclic alkyl group. Specifically, the $C_{1-10}$ alkyl group may be a straight-chain $C_{1-10}$ alkyl group; a straight-chain $C_{1-5}$ alkyl group; a branched-chain or cyclic $C_{3-10}$ alkyl group; or a branched-chain or cyclic $C_{3-6}$ alkyl group. More specifically, examples of the $C_{1-10}$ alkyl group may include methyl group, ethyl group, n-propyl group, iso-propyl group, n-butyl group, iso-butyl group, tert-butyl group, n-pentyl group, iso-pentyl group, neo-pentyl group or cyclohexyl group, etc.

The $C_{1-10}$ alkoxy group may be a straight-chain, branched-chain or cyclic alkoxy group. Specifically, the $C_{1-10}$ alkoxy group may be a straight-chain $C_{1-10}$ alkoxy group; a straight-chain $C_{1-5}$ alkoxy group; a branched-chain or cyclic $C_{3-10}$ alkoxy group; or a branched-chain or cyclic C alkoxyl group. More specifically, examples of the $C_{1-10}$ alkoxy group may include methoxy group, ethoxy group, n-propoxy group, iso-propoxy group, n-butoxy group, iso-butoxy group, tert-butoxy group, n-pentoxy group, iso-pentoxy group, neo-pentoxy group or cycloheptoxy group, etc.

The $C_{1-10}$ fluoroalkyl group may be a group in which at least one hydrogen in the $C_{1-10}$ alkyl group is substituted with fluorine, and the $C_{1-10}$ fluoroalkoxy group may be a group in which at least one hydrogen in the $C_{1-10}$ alkoxy group is substituted with fluorine.

The $C_{2-10}$ alkenyl group may be a straight-chain, branched-chain or cyclic alkenyl group. Specifically, the $C_{2-10}$ alkenyl group may be a straight-chain $C_{2-10}$ alkenyl group, a straight-chain $C_{2-5}$ alkenyl group, a branched-chain $C_{3-10}$ alkenyl group, a branched-chain $C_{3-6}$ alkenyl group, a cyclic $C_{5-10}$ alkenyl group or a cyclic $C_{6-8}$ alkenyl group. More specifically, examples of the $C_{2-10}$ alkenyl group may include an ethenyl group, a propenyl group, a butenyl group, a pentenyl group or a cyclohexenyl group, etc.

The halogen may be fluorine (F), chlorine (Cl), bromine (Br) or iodine (I).

The multivalent organic group derived from an arbitrary compound refers to a residue in which a plurality of hydrogen atoms bonded to the arbitrary compound are removed. In one example, a tetravalent organic group derived from cyclobutane refers to a residue in which any four hydrogen atoms bonded to cyclobutane are removed.

In the present disclosure, the notation —* refers to a residue in which hydrogens at the relevant site are removed. For example, the notation

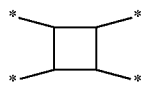 [SMILES: *C1C(*)C(*)C1*]

refers to a residue in which four hydrogen atoms bonded to carbon numbers 1, 2, 3 and 4 of cyclobutane are removed, that is, it refers to any one of tetravalent organic groups derived from cyclobutane.

Polymers for Liquid Crystal Alignment Agent

The polymer for liquid crystal alignment agent includes two or more repeating units selected from the group consisting of a repeating unit represented by Chemical Formula 1, a repeating unit represented by Chemical Formula 2 and a repeating unit represented by Chemical Formula 3.

In the repeating units of Chemical Formulas 1 to 3, $X^1$ is a tetravalent organic group represented by Chemical Formula 4, $X^2$ and $X^3$ are each independently a tetravalent organic group derived from a hydrocarbon having 4 to 20 carbon atoms, or a tetravalent organic group in which at least one hydrogen in the tetravalent organic group is substituted with a halogen or at least one —$CH_2$— is replaced by —O—, —CO—, —S—, —SO—, —$SO_2$— or —CONH— such that oxygen or sulfur atoms are not directly linked.

As an example, the $X^2$ and $X^3$ can be each independently a tetravalent organic group represented by Chemical Formula 6 below.

[Chemical Formula 6]

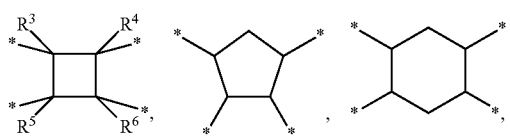

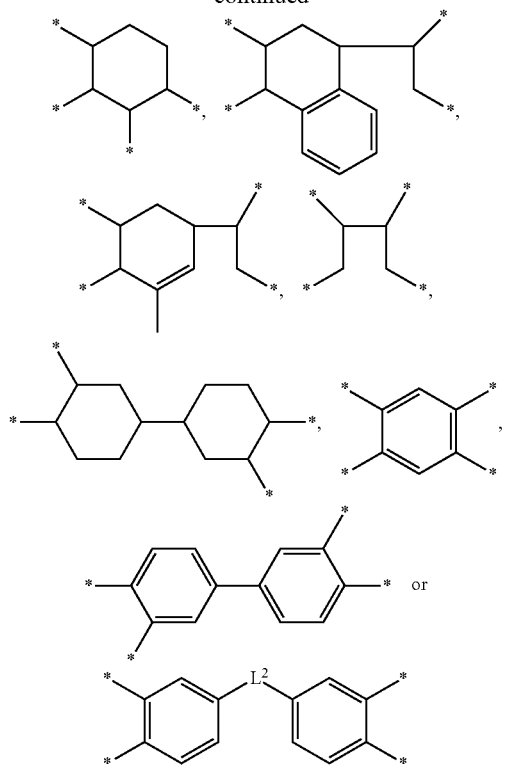

in Chemical Formula 6, $R^3$ to $R^6$ are each independently hydrogen, or $C_{1-6}$ alkyl, $L^2$ is any one selected from the group consisting of a single bond, —O—, —CO—, —S—, —SO—, —$SO_2$—, —$CR_9R_{10}$—, —CONH—, phenylene, or a combination thereof, wherein $R_9$ and $R_{10}$ are each independently hydrogen, an alkyl group or a fluoroalkyl group having 1 to 10 carbon atoms.

Meanwhile, the $Y^1$ to $Y^3$ may be defined as a divalent organic group represented by Chemical Formula 5, thereby providing polymers for liquid crystal alignment agents having various structures capable of exhibiting the above-mentioned effects.

In Chemical Formula 5, the carbon which is not substituted with $R^7$ or $R^8$ is bonded to hydrogen, and when p or q is an integer of 2 to 4, a plurality of $R^7$ or $R^8$ may be the same or different substituents. In Chemical Formula 5, m may be an integer of 0 to 3, or an integer of 0 or 1.

Further, the polymer for liquid crystal alignment agent may include the repeating unit represented by Chemical Formula 1, which is an imide repeating unit, in an amount of 5 to 74 mol %, preferably 10 to 60 mol %, based on the total repeating units, among the repeating units represented by Chemical Formula 1, Chemical Formula 2 and Chemical Formula 3.

As described above, when the polymer which includes a specific amount of the imide repeating unit represented by Chemical Formula 1 is used, the polymer includes a certain amount of already imidized imide repeating units, and thus, a liquid crystal alignment film having excellent alignment properties and stability can be prepared even when the high-temperature heat treatment process is omitted and light is directly irradiated.

If the repeating unit represented by Chemical Formula 1 is included less than the content range, sufficient alignment properties may not be exhibited and alignment stability may be deteriorated. On the contrary, if the content of the repeating unit represented by Chemical Formula 1 exceeds the content range, the solubility is reduced, and thus it may be difficult to prepare a stable alignment solution capable of coating, which is problematic. Accordingly, it is preferable to include the repeating unit represented by Chemical Formula 1 within the above-mentioned content range, because it can provide a polymer for liquid crystal alignment agent having excellent storage stability, electrical characteristics, alignment properties and alignment stability.

Further, the repeating unit represented by Chemical Formula 2 or the repeating unit represented by Chemical Formula 3 may be included in an appropriate amount depending on the desired characteristics.

Specifically, the repeating unit represented by Chemical Formula 2 may be included in an amount of 0 to 40 mol %, preferably 0 to 30 mol %, based on the total repeating units represented by Chemical Formulae 1 to 3. The repeating unit represented by Chemical Formula 2 has a low rate of conversion to imide during the high-temperature heat treatment process after the light irradiation, and thus if the above range is exceeded, the overall imidization rate is insufficient, thereby deteriorating the alignment stability. Accordingly, the repeating unit represented by Chemical Formula 2 exhibits an appropriate solubility within the above-mentioned range and thus can provide a polymer for liquid crystal alignment agent which can implement a high imidization rate, while having excellent processing properties.

Furthermore, the repeating unit represented by Chemical Formula 3 may be included in an amount of 0 to 95 mol %, preferably 10 to 90 mol %, based on the total repeating units represented by Chemical Formulae 1 to 3.

Within such a range, excellent coating properties can be exhibited, thereby providing a polymer for liquid crystal alignment agent which can implement a high imidization rate, while having excellent processing properties.

Compound Having Two or More Epoxy Groups in a Molecule

In addition to the polymer for liquid crystal alignment agent described above, the present invention allows the liquid crystal alignment composition to contain a compound having two or more epoxy groups in a molecule, and thereby a liquid crystal alignment film prepared therefrom can exhibit a high voltage holding ratio.

The molecular weight of the compound having two or more epoxy groups in a molecule may preferably be from 100 to 10,000.

The structure of the compound having two or more epoxy groups in the molecule is not particularly limited, and examples thereof include a cycloaliphatic-based epoxy, a novolak-based epoxy, a bisphenol-based epoxy, a biphenyl-based epoxy, a glycidyl amine-based epoxy, a cyanuric acid-based epoxy, or a combination of two or more thereof. As specific examples thereof, any one or more of the compounds represented by Chemical Formulas 7 to 14 below may be used, but it is not limited to the following compounds.

[Chemical Formula 7]

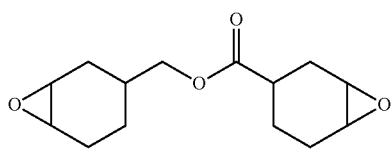

[Chemical Formula 8]

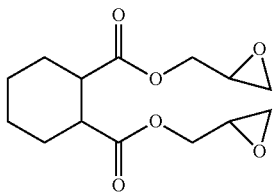

[Chemical Formula 9]

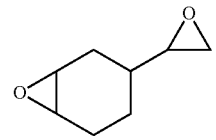

[Chemical Formula 10]

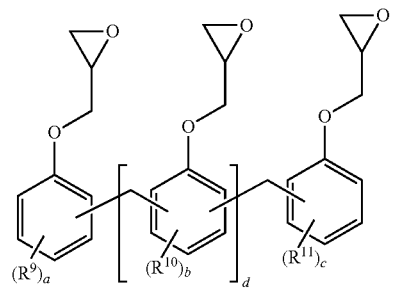

in Chemical Formula 10, $R^9$, $R^{10}$ and $R^{11}$ are each independently hydrogen, or methyl, a, b and c are each independently an integer of 0 to 3, d is an integer of 0 to 20,

[Chemical Formula 11]

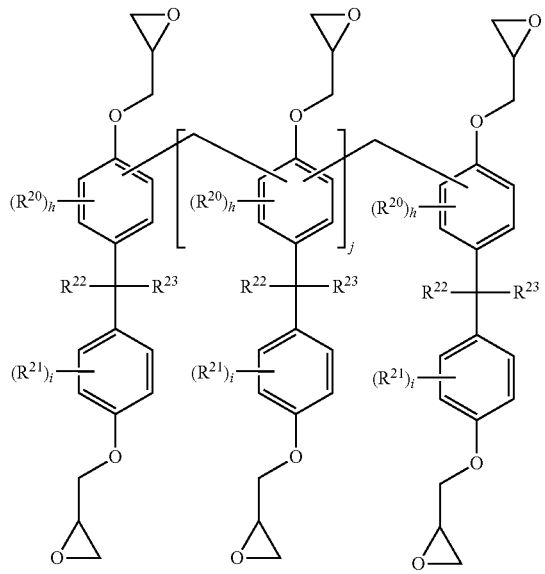

[Chemical Formula 12]

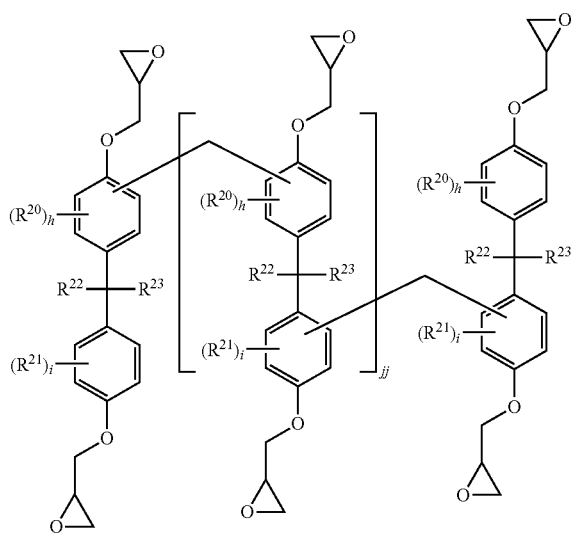

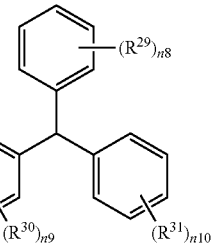

in Chemical Formulas 11 and 12, $R^{20}$ and $R^{21}$ are each independently hydrogen, or halogen, $R^{22}$ and $R^{23}$ are each independently hydrogen, or methyl, h and i are each independently an integer of 0 to 3, j is an integer of 0 to 20,

[Chemical Formula 13]

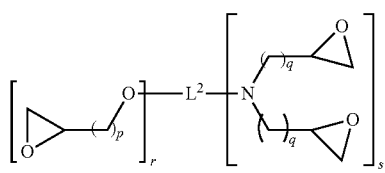

in Chemical Formula 13, p and q are each independently an integer of 1 to 6, r and s are each independently an integer of 0 to 4, and r+s is 2 or more except when r=0 and s=1, $L^2$ is any one r+s valent functional group selected from the group consisting of:

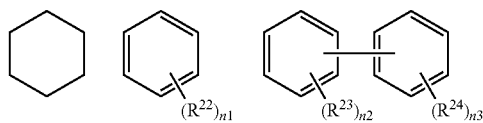

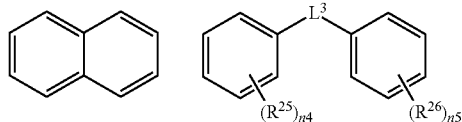

wherein, $R^{22}$ to $R^{31}$ are each independently hydrogen, methyl, or halogen, $L^3$ and $L^4$ are each independently —O—, —CO—, —S—, —SO$_2$—, —C(CH$_3$)$_2$—, —C(CF$_3$)$_2$—, —CONH—, —COO—, —(CH$_2$)$_u$—, or —O(CH$_2$)$_u$O—, wherein u is an integer of 1 to 10, n1 to n10 are each independently an integer of 0 to 4,

[Chemical Formula 14]

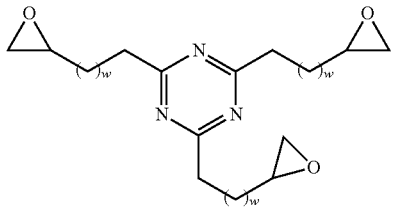

in Chemical Formula 14, w is each independently an integer of 1 to 10.

In addition, the compound having two or more epoxy groups in the molecule is preferably contained in an amount of 0.1 to 30% by weight based on the weight of the above-described polymer for liquid crystal alignment agent.

Method for Preparing a Liquid Crystal Alignment Film

In addition, the present invention provides a method for preparing a liquid crystal alignment film comprising the steps of: coating a liquid crystal alignment composition onto a substrate to form a coating film (step 1); drying the coating film (step 2); irradiating the coating film with light immediately after the drying step to perform alignment treatment (step 3); and curing the alignment-treated coating film by heat treatment (step 4).

The step 1 is a step of coating the above-described liquid crystal alignment composition onto a substrate to form a coating film.

The method of coating the liquid crystal alignment composition onto a substrate is not particularly limited, and for example, a method such as screen printing, offset printing, flexographic printing, inkjet, and the like can be used.

Furthermore, the liquid crystal alignment composition may be those which are dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate and the like. They can be used alone or in combination of two or more.

In addition, the liquid crystal alignment composition may further include other components in addition to the organic solvent. In a non-limiting example, when the liquid crystal alignment composition is coated, an additive capable of improving the uniformity of the film thickness and the surface smoothness, improving the adhesion between a liquid crystal alignment film and a substrate, changing the dielectric constant and conductivity of a liquid crystal alignment film or increasing the denseness of a liquid crystal alignment film, may further be included. Examples of such additives include various solvents, surfactants, silane-based compounds, dielectrics or crosslinking compounds, etc.

The step 2 is a step of drying the coating film formed by coating the liquid crystal alignment composition onto a substrate.

In the step of drying the coating film, a method such as heating of a coating film or vacuum evaporation may be used, and the drying may be preferably carried out at 50 to 150° C. or at 60 to 140° C.

The step 3 is a step of irradiating the coating film with light immediately after the drying step to perform alignment treatment.

In the present disclosure, the "coating film immediately after the drying step" refers to irradiating the light immediately after the drying step without carrying out a heat treatment at a temperature equal to or higher than that of the drying step, and other steps other than the heat treatment can be added.

More specifically, when a liquid crystal alignment film is prepared using a conventional liquid crystal alignment agent including polyamic acid or polyamic acid ester, it includes a step of irradiating light after essentially performing a high-temperature heat treatment for imidization of the polyamic acid. However, when a liquid crystal alignment film is prepared using the liquid crystal alignment agent of one embodiment described above, it does not include the heat treatment step, but light is directly irradiated to perform alignment treatment, and then the alignment-treated coating film is cured by a heat treatment, thereby preparing a liquid crystal alignment film having sufficient alignment properties and enhanced stability even under a small amount of light irradiation energy.

In addition, in the alignment treatment step, the light irradiation is preferably performed by irradiating polarized ultraviolet rays having a wavelength of 150 to 450 nm. Herein, the intensity of the light exposure may vary depending on the kind of the polymer for liquid crystal alignment agent, and preferably an energy of 10 mJ/cm$^2$ to 10 J/cm$^2$, more preferably an energy of 30 mJ/cm$^2$ to 2 J/cm$^2$ may be irradiated.

As for the ultraviolet rays, the polarized ultraviolet rays selected from the ultraviolet rays subjected to polarization treatment by a method of passing through or reflecting through (1) a polarizing device using a substrate in which a dielectric anisotropic material is coated on the surface of a transparent substrate such as quartz glass, soda lime glass, soda lime free glass, etc., (2) a polarizer plate on which aluminum or metal wires are finely deposited, or (3) a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing an angle of incidence toward a specific angle. By this method, the alignment ability of the liquid crystal molecules is imparted to the coating film.

The step 4 is a step of curing the alignment-treated coating film by heat treatment.

The step of curing the alignment-treated coating film by heat treatment is a step that is carried out after the irradiation of light even in the method for preparing a liquid crystal alignment film using a polymer for liquid crystal alignment agent including a conventional polyamic acid or polyamic acid ester, and is distinguished from the heat treatment step of coating the liquid crystal alignment composition onto a substrate and then performing imidization of the liquid crystal alignment composition before irradiating the light or while irradiating the light.

Herein, the heat treatment may be carried out by a heating means such as a hot plate, a hot air circulation path, an infrared ray furnace and the like, and the heat treatment is preferably carried out at a temperature of 150 to 300° C., or 200 to 250° C.

Liquid Crystal Alignment Film

Further, the present invention provides a liquid crystal alignment film prepared in accordance with the method for preparing a liquid crystal alignment film described above.

As described above, when the polymer containing two or more repeating units selected from the group consisting of the repeating unit represented by Chemical Formula 1, the repeating unit represented by Chemical Formula 2, and the repeating unit represented by Chemical Formula 3, particularly containing the imide repeating unit represented by Chemical Formula 1 among the above repeating units in an amount of 5 to 74 mol % is used, a liquid crystal alignment film having enhanced alignment property and stability can be prepared.

Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared from the polymer including the repeating unit represented by Chemical Formula 1 in a specific amount and thus can implement excellent stability together with excellent physical properties. Accordingly, there may be provided a liquid crystal display device which can exhibit high reliability.

In addition, the present invention provides a liquid crystal display device comprising: a liquid crystal alignment film including a cured product in which the polymer for liquid crystal alignment agent containing a polyimide-based repeating unit and a polyamic acid or polyamic acid ester-based repeating unit, the polyimide-based repeating unit being contained in an amount of 5 to 74 mol % relative to the total repeating units, is photo-aligned, and cured via a compound having two or more epoxy groups in the molecule; and a liquid crystal layer that is formed on the liquid crystal alignment film and contains liquid crystal molecules aligned in a liquid crystal direction by the photo-aligned polymer, wherein polarizing plates are attached above or below the liquid crystal display device in a direction perpendicular to each other, no light leakage was observed when light was applied to a backlight of 7,000 cd/m², and a voltage holding ratio measured under severe display conditions of 60 Hz, 60° C. is 90% or more.

Advantageous Effects

According to the present invention, a process for preparing a liquid crystal alignment film in which, after coating the liquid crystal alignment composition onto a substrate and drying it, the heat treatment process at a high temperature is omitted, and the light is directly irradiated to perform alignment treatment, followed by curing it by heat treatment, whereby not only the light irradiation energy can be reduced but also the liquid crystal alignment film having enhanced alignment property and stability can be prepared by a simplified process; a liquid crystal alignment film and a liquid crystal display device including the same are provided. Further, the liquid crystal alignment composition according to the present invention includes a compound having two or more epoxy groups in a molecule in addition to the polymer for liquid crystal alignment agent, and thereby a liquid crystal alignment film prepared therefrom can exhibit a high voltage holding ratio.

DETAILED DESCRIPTION OF THE EMBODIMENTS

Hereinafter, preferred embodiments of the present invention will be presented in order to facilitate understanding of the present invention. However, the following examples are provided only for the purpose of easier understanding of the present invention, and the present invention is not limited thereto.

Preparation Example 1: Synthesis of Diamine DA-1

Diamine DA-1 was synthesized according to the following reaction.

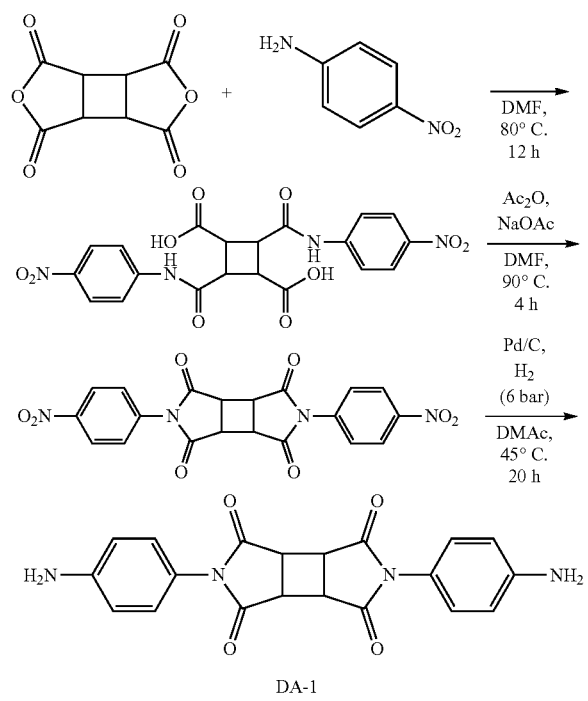

DA-1

Specifically, CBDA (cyclobutane-1,2,3,4-tetracarboxylic dianhydride) and 4-nitroaniline were dissolved in DMF (dimethylformamide) to prepare a mixture. Then, the mixture was reacted at about 80° C. for about 12 hours to prepare an amic acid. Subsequently, the amic acid was dissolved in DMF, and acetic anhydride and sodium acetate were added thereto to prepare a mixture. Then, the amic acid contained in the mixture was imidized at about 90° C. for about 4 hours. The thus-obtained imide was dissolved in DMAc (dimethylacetamide), and then palladium on carbon (Pd—C) was added thereto to prepare a mixture. The mixture was reduced at 45° C. under hydrogen pressure of 6 bar for 20 minutes to prepare diamine DA-1.

Preparation Example 2: Synthesis of Diamine DA-2

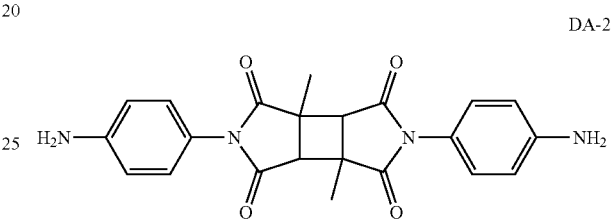

DA-2 having the structure above was prepared in the same manner as in Preparation Example 1, except that DMCBDA (1,3-dimethylcyclobutane-1,2,3,4-tetracarboxylic dianhydride) was used instead of CBDA (cyclobutane-1,2,3,4-tetracarboxylic dianhydride).

Preparation Example 3: Synthesis of Diamine DA-3

Diamine DA-3 was synthesized according to the following reaction.

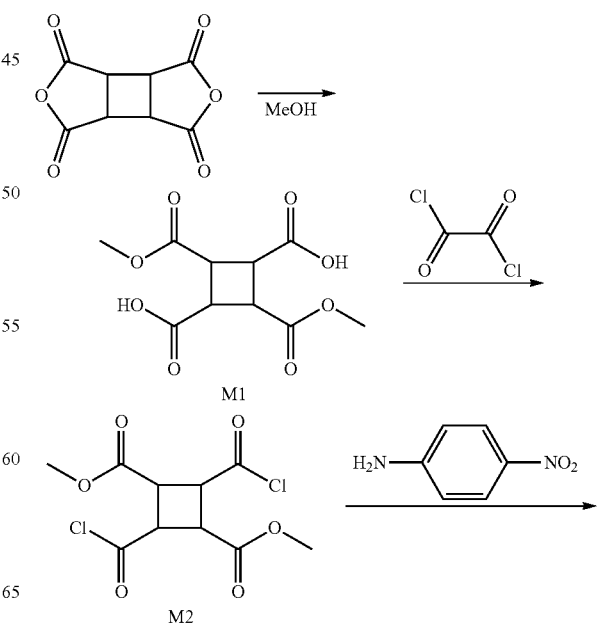

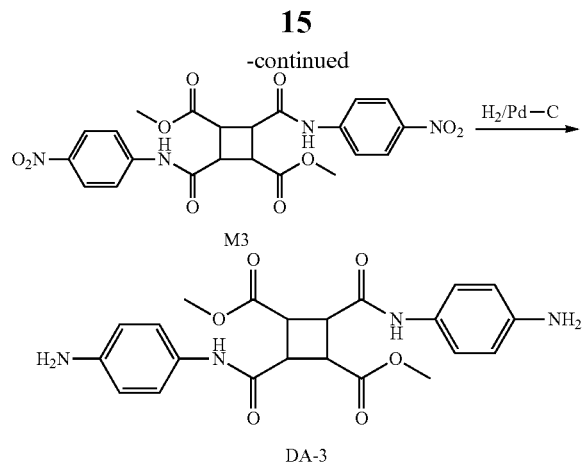

Specifically, 25 g of CBDA (cyclobutane-1,2,3,4-tetracarboxylic dianhydride) was added to 250 mL of methanol, to which 1 to 2 drops of hydrochloric acid was added, and the mixture was heated under reflux at 75° C. for 5 hours. After the solvent was removed under reduced pressure, 300 mL of ethyl acetate and n-hexane were added to solidify the solution. The resulting solid was collected by vacuum filtration and dried under reduced pressure at 40° C. to obtain 32 g of M1.

To 34 g of M1 obtained was added 100 mL of toluene and then 35 g of oxalyl chloride was added dropwise at room temperature. Two to three drops of dimethylformamide (DMF) were added dropwise and the mixture was stirred at 50° C. for 16 hours. After cooling to room temperature, the solvent and residual oxalyl chloride were removed under reduced pressure. 300 mL of n-hexane was added to the yellow solid product, followed by heating under reflux at 80° C. The heated reaction solution was filtered to remove the impurity which was insoluble in n-hexane and slowly cooled up to room temperature. The resulting white crystals were filtered and then dried in a vacuum oven at 40° C. to obtain 32.6 g of M2.

29.6 g of 4-nitroaniline and 21.7 g of triethanolamine (TEA) were added to 400 mL of tetrahydrofuran (THF) and then 32.6 g of M2 was added at room temperature. After stirring at room temperature for 16 hours, the resulting precipitate was filtered. 400 mL of dichloromethane was added to the filtrate, which was washed with 0.1N hydrochloric acid and then again washed with a saturated aqueous solution of sodium bicarbonate (NaHCO$_3$). The washed organic solution was filtered under reduced pressure to obtain a solid product, which was again recrystallized with dichloromethane to obtain 43 g of a solid dinitro compound M3.

43 g of the resulting dinitro compound M3 was added to a high-pressure reactor and then dissolved in 500 mL of THF, to which 2.2 g of 10 wt % Pd—C was added, and the mixture was stirred at room temperature for 16 hours under hydrogen gas (H$_2$, 3 atm). After the reaction, Pd—C was removed by filtration through celite filter, and the filtrate was concentrated under reduced pressure to obtain 37 g of esterified diamine DA-3.

Preparation Example 4: Preparation of Polymer for Liquid Crystal Alignment Agent P-1

(Step 1)
5.0 g (13.3 mmol) of DA-1 prepared in Preparation Example 1 was completely dissolved in 71.27 g of anhydrous N-methyl pyrrolidone (NMP). Subsequently, 2.92 g (13.03 mmol) of 1,3-dimethylcyclobuthane-1,2,3,4-tetracarboxylic dianhydride was added to the solution under an ice bath and then stirred at room temperature for 16 hours.

(Step 2)
The solution obtained in Step 1 was poured into an excessive amount of distilled water to form a precipitate. Subsequently, the formed precipitate was filtered and washed twice with distilled water and again three times with methanol. The thus-obtained solid product was dried in a vacuum oven at 40° C. for 24 hours to obtain 6.9 g of the polymer for liquid crystal alignment agent P-1.

As a result of confirming the molecular weight of P-1 through gel permeation chromatography (GPC), the number average molecular weight (Mn) was 15,500 g/mol, and the weight average molecular weight (Mw) was 31,000 g/mol. Further, the monomer structure of the polymer P-1 is determined by the equivalent ratio of the monomers used, and the ratio of the imide structure in the molecule was 50.5%, and the ratio of the amic acid structure in the molecular was 49.5%.

Preparation Example 5: Preparation of Polymer for Liquid Crystal Alignment Agent P-2

5.0 g of DA-2 prepared in Preparation Example 2 and 1.07 g of p-phenylenediamine were first dissolved in 89.81 g of NMP, to which 1.90 g of cyclobutane-1,2,3,4-tetracarboxylic dianhydride (CBDA) and 3.00 g of oxydiphthalic dianhydride were added, and the mixture was stirred at room temperature for 16 hours. Thereafter, the polymer P-2 was prepared in the same manner as in Step 2 of Preparation Example 4.

As a result of confirming the molecular weight of P-2 through GPC, the number average molecular weight (Mn) was 17,000 g/mol, and the weight average molecular weight (Mw) was 33,000 g/mol. Further, as for the polymer P-2, the ratio of the imide structure in the molecule was 33.8%, and the ratio of the amic acid structure in the molecule was 66.2%.

Preparation Example 6: Preparation of Polymer for Liquid Crystal Alignment Agent P-3

5.0 g of DA-1 prepared in Preparation Example 2 and 3.93 g of DA-3 prepared in Preparation Example 3 were first dissolved in 127.94 g of NMP, to which 5.28 g of cyclobutane-1,2,3,4-tetracarboxylic dianhydride (CBDA) was added, and the mixture was stirred at room temperature for 16 hours. Thereafter, the polymer P-3 was prepared in the same manner as in the Step 2 of Preparation Example 4.

Preparation Example 7: Preparation of Polymer for Liquid Crystal Alignment Agent P-4

6.00 g of p-phenylenediamine was first dissolved in 156.9 g of NMP, to which 5.34 g of cyclobutane-1,2,3,4-tetracarboxylic dianhydride (CBDA) and 6.10 g of 1,3-dimethyl-cyclobutane-1,2,3,4-tetracarboxylic dianhydride (DMCBDA) were added, and the mixture was stirred at room temperature for 16 hours. Thereafter, the polymer P-4 was prepared in the same manner as in Step 2 of Preparation Example 4.

As a result of confirming the molecular weight of P-4 through GPC, the number average molecular weight (Mn) was 15,000 g/mol, and the weight average molecular weight (Mw) was 28,000 g/mol. As a result of analyzing the monomer structure of B-2, the ratio of the amic acid structure in the molecular was 100%.

Example 1: Preparation of Liquid Crystal Alignment Composition 1 g of the polymer P-1 for liquid crystal alignment agent prepared in Preparation Example 4 was dissolved in 20 g of a mixed solvent containing NMP and n-butoxyethanol in a weight ratio of 8:2, and then 50 mg of (3',4'-epoxycyclohexane)methyl 3,4-epoxycyclohexyl carboxylate (Celloxide 2021P manufactured by Daicel Corporation) was added and allowed to completely dissolve. The resultant solution was subjected to pressure filtration with a filter made of poly(tetrafluoroethylene) having a pore size of 0.2 µm to prepare a liquid crystal alignment composition.

Example 2: Preparation of Liquid Crystal Alignment Composition

A liquid crystal alignment composition was prepared in the same manner as in Example 1, except for using the polymer for liquid crystal alignment agent P-2 instead of the polymer for liquid crystal alignment agent P-1, and 0.1 g of 4,4'-methylenebis(N,N'-diglycidylaniline) (Aldrich) instead of 50 mg of Celloxide 2021P.

Example 3: Preparation of Liquid Crystal Alignment Composition

A liquid crystal alignment composition was prepared in the same manner as in Example 1, except for using the polymer for liquid crystal alignment agent P-3 instead of the polymer for liquid crystal alignment agent P-1, and 2,2'-(3,3',5,5'-tetramethylbiphenyl-4,4'-diyl)bis(oxy)bis(methylene)dioxirane (YX-4000 manufactured by Mitsubishi Chemical Co., Ltd.) instead of Celloxide 2021P.

Comparative Example 1: Preparation of Liquid Crystal Alignment Composition

A liquid crystal alignment composition was prepared in the same manner as in Example 1, except that Celloxide 2021P was not used.

Comparative Example 2: Preparation of Liquid Crystal Alignment Composition

A liquid crystal alignment composition was prepared in the same manner as in Example 1, except that the polymer for liquid crystal alignment agent P-4 was used instead of the polymer for liquid crystal alignment agent P-1.

Experimental Example

1) Preparation of Liquid Crystal Alignment Cell

A liquid crystal alignment cell was prepared using the liquid crystal alignment compositions prepared in the above Examples and Comparative Examples.

Specifically, the liquid crystal alignment composition was spin-coated onto each of the upper and lower substrates for voltage holding ratio (VHR) in which indium tin oxide (ITO) electrodes having a thickness of 60 nm and an area of 1 cm×1 cm were patterned on a rectangular glass substrate having a size of 2.5 cm×2.7 cm. Subsequently, the substrates coated with the liquid crystal alignment composition were placed on a hot plate at about 70° C. for 3 minutes to evaporate the solvent. In order to subject the thus-obtained coating film to alignment treatment, the ultraviolet irradiation (254 nm) was applied to the coating film of each of the upper and lower substrates at a dose of 1 J/cm$^2$ using an exposure apparatus to which a linear polarizer was adhered. Then, the alignment-treated upper and lower substrates were baked (cured) in an oven at about 230° C. for 30 minutes to obtain a coating film having a thickness of 0.1 µm. Then, a sealing agent impregnated with a ball spacer having a size of 4.5 µm was applied to the edge of the upper substrate except the liquid crystal injection hole. Subsequently, the alignment films formed on the upper and lower substrates were aligned such that they face each other and the alignment directions are aligned with each other, and then the upper and lower substrates were bonded together and the sealing agent was thermally cured with UV to prepare an empty space. Then, a liquid crystal was injected into the empty cells, and the injection port was sealed with a sealing agent to prepare a liquid crystal alignment cell.

2) Evaluation of Alignment Properties of Liquid Crystal

Polarizing plates were attached to the upper and lower substrate plates of the prepared liquid crystal alignment cell so as to be perpendicular to each other. Then, the liquid crystal alignment cell to which the polarizing plates were attached was placed on a backlight having a luminance of 7,000 cd/cm$^2$, and light leakage was observed by the naked eye. At this time, if the alignment properties of the liquid crystal alignment film were excellent and so the liquid crystals were well aligned, the light was not passed through the upper and lower polarizing plates attached vertically to each other, and it was observed dark without defects. In this case, the alignment property was evaluated as 'good'; and if the light leakage such as the liquid crystal flow mark or the bright spot was observed, it was evaluated as 'poor'. The results are shown in Table 1 below.

3) Evaluation of Voltage Holding Ratio

The voltage holding ratio (VHR), which is the electrical characteristic of the liquid crystal alignment cell prepared above, was measured, using a TOYO 6254 equipment. The voltage holding ratio was measured under severe conditions of 60 Hz and 60° C. The voltage maintenance ratio was an ideal value when it was 100%. It was evaluated as 'excellent' when the measurement result was 90% or more; 'ordinary' when the measurement result was less than 90%; and 'poor' when the measurement was 80% or less. The results are shown in Table 1 below.

TABLE 1

| Liquid crystal alignment composition | Alignment properties | VHR properties |
| --- | --- | --- |
| Example 1 | Good | Excellent |
| Example 2 | Good | Excellent |
| Example 3 | Good | Excellent |
| Comparative Example 1 | Good | Poor |
| Comparative Example 2 | Bad | Ordinary |

The invention claimed is:
1. A liquid crystal alignment composition comprising:
(i) a copolymer for liquid crystal alignment agent including a repeating unit represented by Chemical Formula 1 below, a repeating unit represented by Chemical Formula 2 below and a repeating unit represented by Chemical Formula 3 below, wherein the repeating unit represented by Chemical Formula 1 below is contained in an amount of 5 to 74 mol % relative to the total repeating units represented by Chemical Formulae 1 to

3 below, and the repeating unit represented by Chemical Formula 3 below is contained in an amount of 10 to 90 mol % relative to the total repeating units represented by Chemical Formulae 1 to 3 below, and (ii) a compound having two or more epoxy groups, wherein the molecular weight of the compound having two or more epoxy groups is not more than 10,000, and the compound is contained in an amount of 0.1 to 30% by weight based on the weight of the copolymer for liquid crystal alignment agent, wherein the repeating unit represented by the Chemical Formula 1 is formed from a diamine that is a reaction product of a compound comprising $X^1$ represented by Chemical Formula 4 and a compound comprising $Y^1$ represented by Chemical Formula 5,

[Chemical Formula 1]

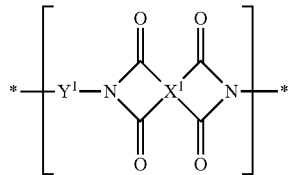

[Chemical Formula 2]

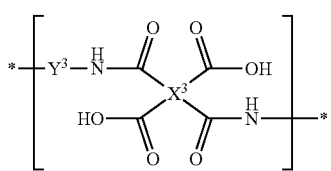

[Chemical Formula 3]

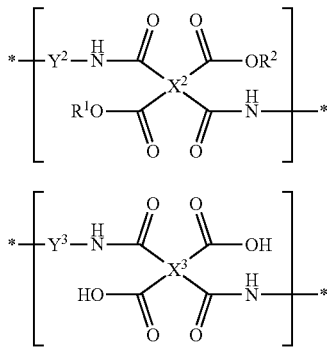

in the Chemical Formulae 1 to 3, $R^1$ and $R^2$ are each independently hydrogen, or $C_{1-10}$ alkyl, with the proviso that both $R^1$ and $R^2$ are not hydrogen, $X^1$ is a tetravalent organic group represented by the Chemical Formula 4 below,

[Chemical Formula 4]

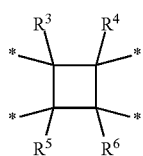

in the Chemical Formula 4, $R^3$ to $R^6$ are each independently hydrogen, or $C_{1-6}$ alkyl, $X^2$ and $X^3$ are each independently a tetravalent organic group derived from a hydrocarbon having 4 to 20 carbon atoms, a tetravalent organic group in which at least one hydrogen in the tetravalent organic group is substituted with a halogen, or a tetravalent organic group in which at least one —$CH_2$— is replaced by —O—, —CO—, —S—, —SO—, —$SO_2$—, or —CONH— such that oxygen or sulfur atoms are not directly linked, and $Y^1$, $Y^2$ and $Y^3$ are each independently a divalent organic group represented by the Chemical Formula 5 below,

[Chemical Formula 5]

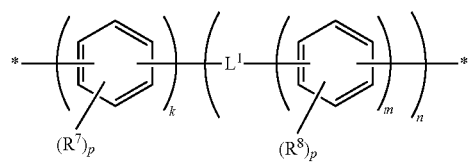

in the Chemical Formula 5, $R^7$ and $R^8$ are each independently halogen, cyano, $C_{1-10}$ alkyl, $C_{2-10}$ alkenyl, $C_{1-10}$ alkoxy, $C_{1-10}$ fluoroalkyl, or $C_{1-10}$ fluoroalkoxy, p and q are each independently an integer of 0 to 4, $L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —NH—, —$NH(CH_2)_z$—NH—, —$NH(CH_2)_zO$—, —$OCH_2$—C$(CH_3)_2$—$CH_2O$—, —COO—$(CH_2)_z$—OCO—, or —OCO—$(CH_2)_z$—COO—, z is an integer of 1 to 10, k and m are each independently an integer of 1 to 3, and n is an integer of 0 to 3, and wherein the compound having two or more epoxy groups is any one or more of the compounds represented by Chemical Formulae 11, 12 and 14 below:

[Chemical Formula 11]

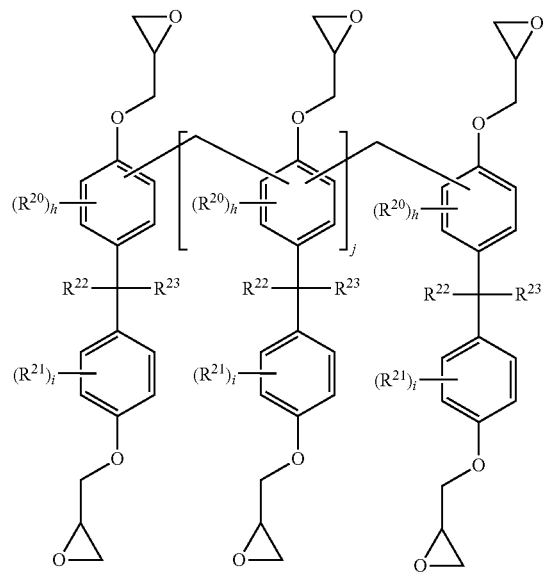

-continued

[Chemical Formula 12]

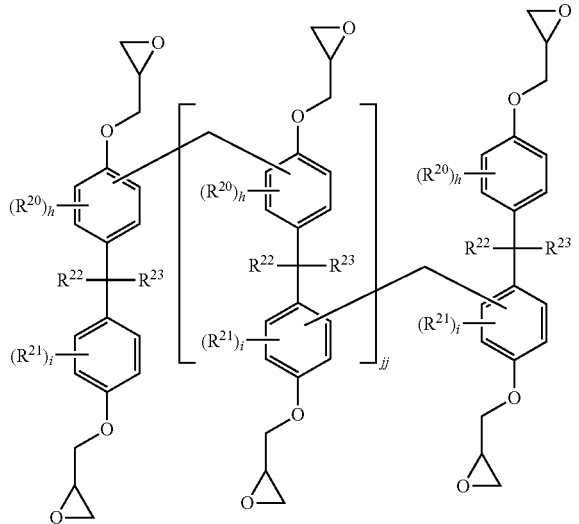

in the Chemical Formulae 11 and 12,
$R^{20}$ and $R^{21}$ are each independently hydrogen, or halogen,
$R^{22}$ and $R^{23}$ are each independently hydrogen, or methyl,
h and i are each independently an integer of 0 to 3, and
j is an integer of 1 to 20,

[Chemical Formula 14]

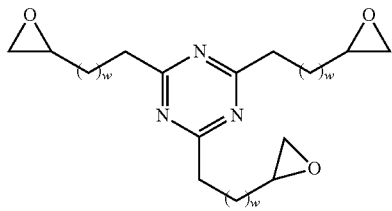

in the Chemical Formula 14,
w is each independently an integer of 1 to 10.

2. The liquid crystal alignment composition according to claim 1, wherein
$X^2$ and $X^3$ are each independently a tetravalent organic group represented by Chemical Formula 6 below:

[Chemical Formula 6]

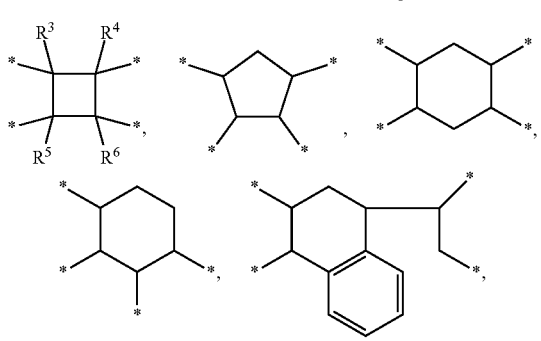

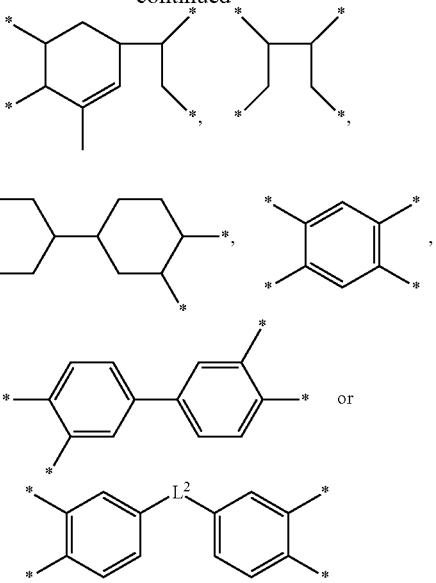

in the Chemical Formula 6,
$R^3$ to $R^6$ are each independently hydrogen, or $C_{1-6}$ alkyl, and
$L^2$ is any one selected from the group consisting of a single bond, —O—, —CO—, —S—, —SO—, —SO$_2$—, —CR$_9$R$_{10}$—, —CONH—, phenylene, or a combination thereof,
wherein $R_9$ and $R_{10}$ are each independently hydrogen, an alkyl group or a fluoroalkyl group having 1 to 10 carbon atoms.

3. A method for preparing a liquid crystal alignment film comprising the steps of:
coating the liquid crystal alignment composition according to claim 1 onto a substrate to form a coating film, wherein the liquid crystal alignment composition is dissolved or dispersed in a solvent prior to the coating step;
drying the coating film;
irradiating the coating film with light immediately after the drying step to perform alignment treatment; and
curing the alignment-treated coating film by heat treatment.

4. The method for preparing a liquid crystal alignment film according to claim 3, wherein
the liquid crystal alignment composition is dissolved or dispersed in an organic solvent.

5. The method for preparing a liquid crystal alignment film according to claim 3, wherein
the step of drying the coating film is carried out at 50 to 50° C.

6. The method for preparing a liquid crystal alignment film according to claim 3, wherein,
in the alignment treatment step, the light irradiation is performed by irradiating polarized ultraviolet rays having a wavelength of 150 to 450 nm.

7. The method for preparing a liquid crystal alignment film according to claim 3, wherein,
the heat treatment is carried out at a temperature of 150 to 300° C.

8. A liquid crystal alignment film prepared by the method preparing the liquid crystal alignment film according to claim 3.

9. A liquid crystal display device including the liquid crystal alignment film according to claim 8.

* * * * *